United States Patent [19]
Loftis et al.

[11] 3,716,108
[45] Feb. 13, 1973

[54] APPARATUS FOR SETTLING DRILL DUST

[75] Inventors: James B. Loftis, Remlap; David L. Moody; James H. Phillips, both of Oneonta, all of Ala.

[73] Assignee: Robbins Machinery Company

[22] Filed: May 14, 1971

[21] Appl. No.: 143,325

[52] U.S. Cl. .................... 175/205, 175/209, 175/212
[51] Int. Cl. .................................................. E21c 7/00
[58] Field of Search ........................ 175/205, 207–213

[56] References Cited

UNITED STATES PATENTS

| | | | |
|---|---|---|---|
| 981,409 | 1/1911 | Goodspeed | 175/209 |
| 1,559,709 | 11/1925 | Knapp | 175/205 X |
| 1,981,570 | 11/1934 | Price | 175/205 X |
| 1,985,157 | 12/1934 | Friedman et al. | 175/213 X |
| 2,144,586 | 1/1939 | Kelley | 175/209 X |
| 2,740,609 | 4/1956 | Richardson et al. | 175/212 X |

*Primary Examiner*—David H. Brown
*Attorney*—Jennings, Carter & Thompson

[57] ABSTRACT

Dust settling apparatus having a first nozzle assembly discharging an atomized mixture of water and air under high pressure toward a hole being bored with the mixture moving in direction opposite direction of movement of dust from hole. A second nozzle assembly discharges an atomized mixture of water and air under high pressure into and in same direction as moving stream of dust after passing first nozzle assembly. Water supplied to nozzle assemblies from a small tank which communicates with lower end of a large tank. Air under high pressure introduced into small tank and air under low pressure introduced into large tank with small tank being exhausted to atmosphere at intervals permitting water to flow from large tank to small tank.

10 Claims, 5 Drawing Figures

INVENTORS.
James B. Loftis
David L. Moody
James H. Phillips
BY Jennings, Carter & Thompson
Attorneys

APPARATUS FOR SETTLING DRILL DUST

BACKGROUND OF THE INVENTION

This invention relates to apparatus for settling drill dust and more particularly to apparatus which assures intimate contact of an atomized mixture of water and air under high pressure with all dust particles discharged from the hole being bored.

As is well known in the art to which our invention relates, difficulties have been encountered in boring holes into rock-like materials containing high percentages of quartz or silicates since dust formed from these materials cannot be breathed continuously without causing a disease of the lungs known as silicosis.

While many devices have been proposed for settling drill dust both prior to and after leaving the hole being bored, such devices have been unsatisfactory. The introduction of water through the drill bit reduces the life of the bit due to excessive wear to the bearings of the bit. The introduction of water exteriorally of the hole being bored by prior art devices has been unsatisfactorily due to the fact that the bailing velocity of the moving stream of dust is such that it outruns the velocity of the water spray. Accordingly, only a small percentage of the dust particles are actually contacted by the water spray. That is, the bailing velocity of the stream of moving chips, dust and air ranges from approximately 4,000 to 5,000 feet per minute.

BRIEF SUMMARY OF THE INVENTION

In accordance with our present invention, we provide a first nozzle assembly in position to discharge an atomized mixture of water and air under high pressure toward the hole being bored with the mixture moving in a direction opposite the direction of movement of the dust from the hole. A second nozzle assembly discharges atomized water and air under high pressure in the same direction as the moving stream of dust after the stream passes the first nozzle assembly. To introduce the mixture of water and air under extremely high pressure, we provide a relatively small tank which communicates with the lower end of a large tank or reservoir for water. Air under high pressure is introduced into the small tank while air under low pressure is introduced into the larger tank and the smaller tank is exhausted at intervals permitting water to flow from the larger tank to the small tank. Accordingly, we provide a continuous, fine particle size vapor which moves at an extremely high velocity to thus assure intimate mixing of the vapor with all the dust particles discharged from the hole being bored.

Apparatus embodying features of our invention is illustrated in the accompanying drawings, forming a part of this application, in which.

Figure 1:
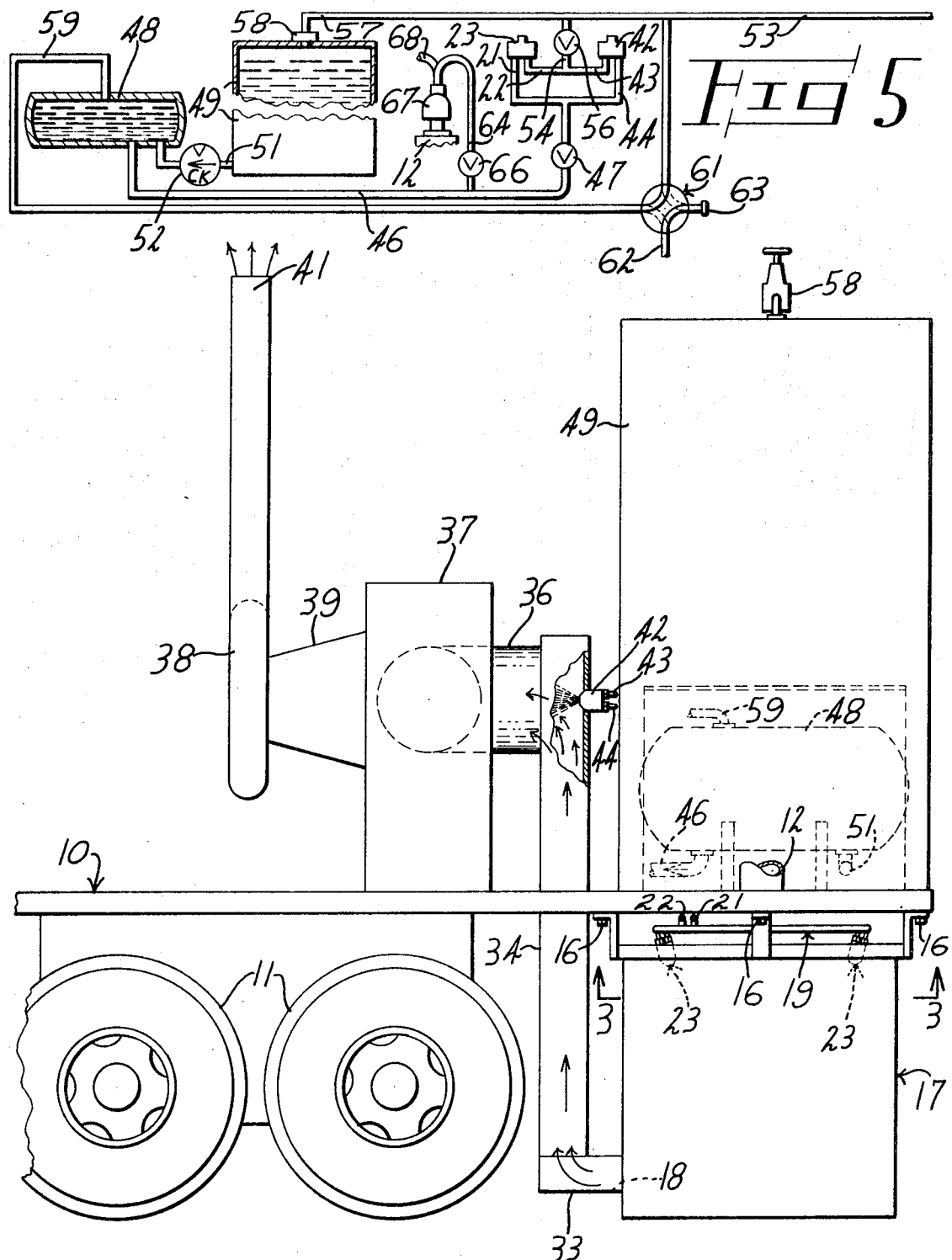
FIG. 1 is a side elevational view, partly broken away and in section, showing our improved apparatus associated with a rotary drill mounted on a translatable frame.

Referring now to the drawings for a better understanding of our invention, we show a translatable frame 10 mounted on wheels 11. The frame 10 carries a rotary drill which is adapted to rotate a hollow drill rod 12 which carries a bit unit at its lower end for drilling a hole 13 in rock-like material 14. The hollow drill rod 12 is made up of a plurality of sections and is adapted to convey air under pressure from an air pressure source to clear the hole 13 being bored of cuttings and dust particles whereby the cuttings and dust particles are discharged from the hole around the outer surface of the drill rod 12 in a manner well understood in the art to which our invention relates. That is, the rotary bit unit and drilling apparatus for imparting rotation to the hollow drill rod 12 and introducing air therethrough is conventional apparatus.

Mounted beneath the rear portion of the frame 10 by suitable retaining elements 16 is a depending housing, indicated generally at 17, which is spaced from and surrounds the portion of the drill rod 12 between the under surface of the frame 10 and the surface of the rock-like material 14 surrounding the hole 13 being bored. A laterally disposed discharge passageway 18 is provided at one side of the housing 17 for receiving cuttings, dust and air from the housing 17 after the cuttings, dust and air have been contacted by an atomized mixture of water and air under high pressure from a nozzle assembly 19.

Figure 3:
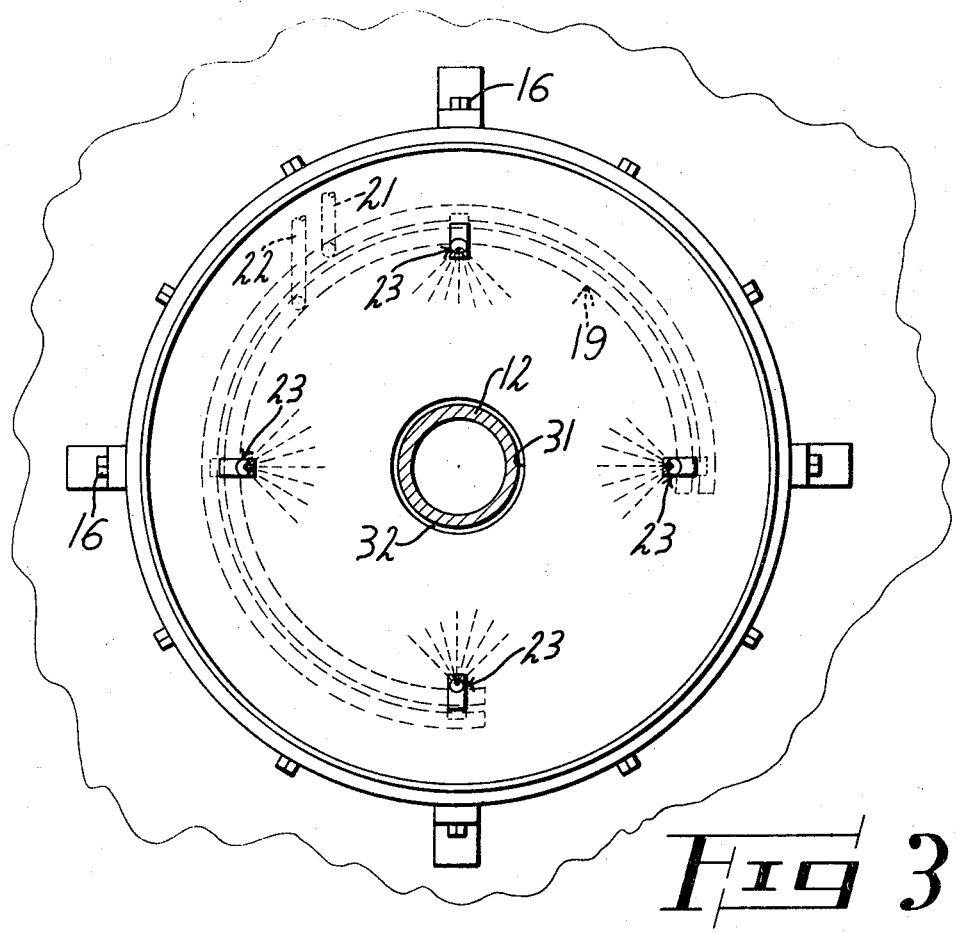
FIG. 3 is a sectional view taken generally along the line 3—3 of FIG. 1.
Figure 4:
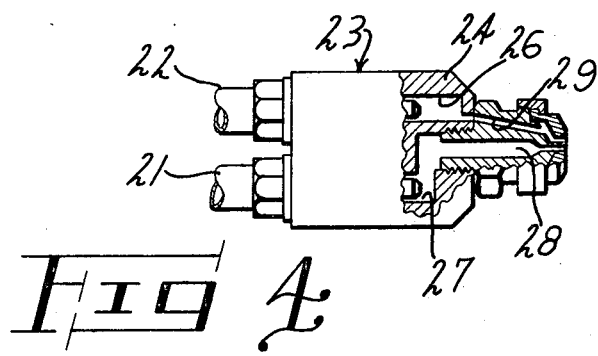
FIG. 4 is an enlarged view, partly broken away, showing one form of nozzle which may be employed; and, FIG. 5 is a diagrammatic view showing the system for supplying water and air under high pressures.

Water and air are supplied to the nozzle assembly 19 by supply conduits 21 and 22, respectively, whereby water and air are supplied under high pressure to angularly spaced nozzles 23. Each nozzle 23 comprises a body portion 24 having separate chambers 26 and 27 therein which communicate with the conduits 22 and 21, as shown in FIG. 4, whereby air under pressure is introduced into chamber 26 while water under pressure is introduced into chamber 27. The water passes from chamber 27 through a forwardly extending passageway 28 while air is conveyed through a forwardly extending passageway 29. The water discharged from passageway 28 mixes with the stream of air passing through passageway 29 adjacent the point of discharge whereby an atomized vapor is discharged from each nozzle 23. As shown in FIG. 3, the nozzles 23 are spaced angularly from each other so that the patterns of adjacent nozzles overlap each other.

Figure 2:
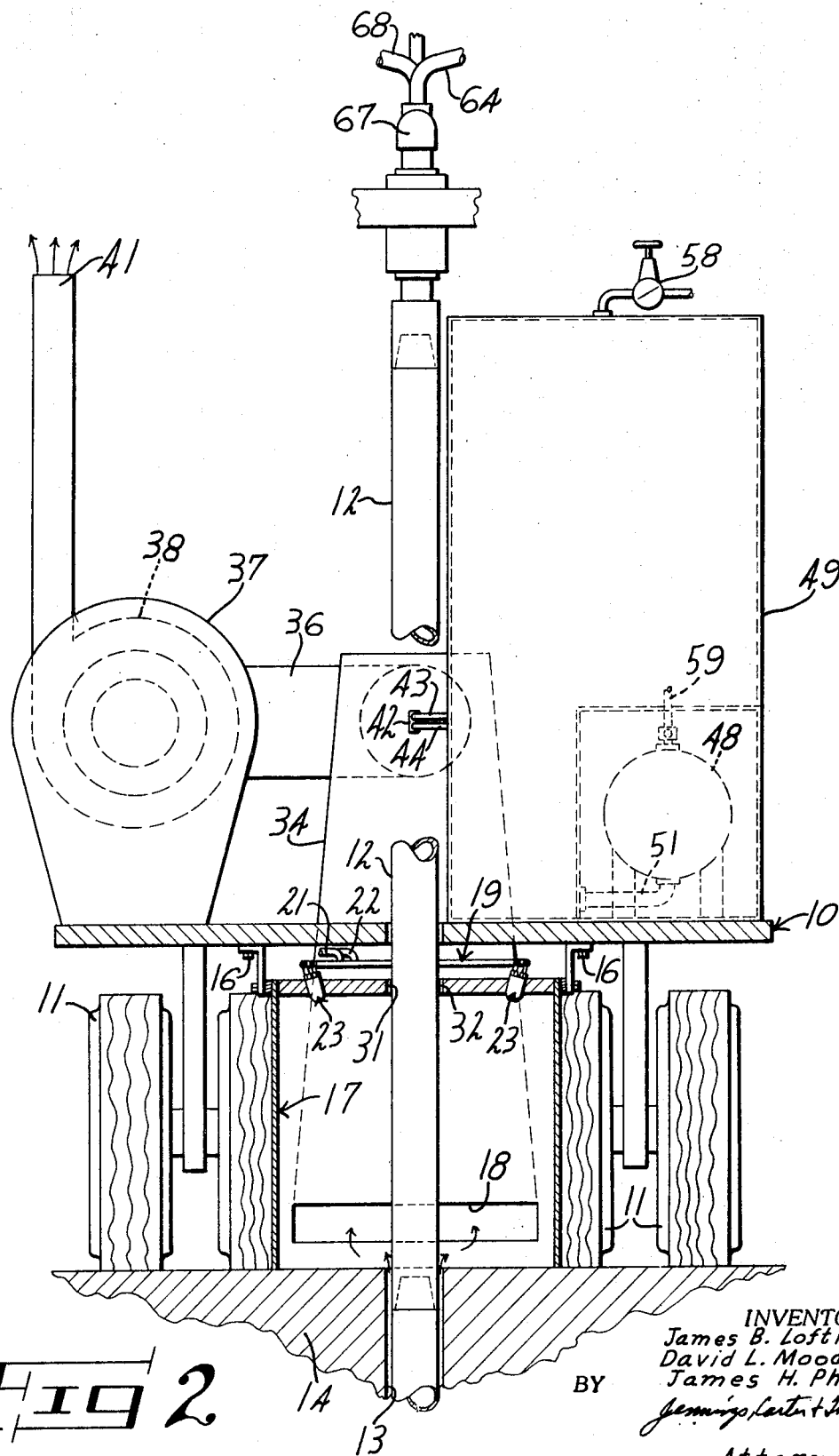
FIG. 2 is an end elevational view, looking from the right side of FIG. 1, parts being broken away and in section.

As shown in FIG. 2, the upper portion of the housing 17 is provided with an opening 31 therethrough for receiving the rotary drill rod 12. An annular flexible seal 32 is mounted within the opening 31 to provide a flexible seal which engages the outer surface of the drill rod 12.

The discharge passageway 18 for the housing 17 communicates with a horizontal conduit 33 which in turn communicates with an upstanding conduit 34, as shown in FIG. 1. The upper end of the conduit 34 is connected to one end of the horizontal conduit 36 with the other end of the conduit 36 being connected to a conventional pre-skimmer unit indicated generally at 37. As the air, cuttings and dust move through the pre-skimmer, the heavier particles are separated from the lighter particles and air and then fall by gravity beneath the pre-skimmer. The air and lighter particles are conveyed from the pre-skimmer 37 to a rotary separator indicated generally at 38 by a conduit 39. The rotary separator 38 is of a conventional type centrifugal separator which discharges the clean air adjacent the upper end of a discharge conduit 41 after the lighter particle size materials are separated therefrom in a manner will understood in the art to which our invention relates.

A nozzle unit 42 is mounted within one vertical wall of the upstanding conduit 34, as shown in FIG. 1 in position to direct an atomized mixture of water and air under high pressure into the moving stream of cuttings, dust and air whereby the atomized mixture moves in the same direction as the moving stream. By discharging the atomized mixture through the nozzle 42 under extremely high pressure, the water-air mixture remains in contact with the moving dust particles for a longer period of time to thus assure complete separation of the dust from the air. The nozzle 42 is of the same type as nozzle 23 of the nozzle assembly 19. Air under high pressure is introduced into nozzle 42 by a conduit 43 while water under high pressure is introduced through a conduit 44.

As shown in FIG. 5, water under high pressure is supplied to the conduits 21 and 44 by a conduit 46 having a control valve 47 therein. Conduit 46 communicates with the bottom of a relatively small tank 48 which is connected to the lower portion of a large supply tank 49 by a conduit 51 having a check valve 52 therein which permits flow of water only from the larger tank 49 to the smaller tank 48.

Air under high pressure, such as ninety pounds per square inch, is supplied by a conduit 53 from a suitable source. Air supply conduit 53 communicates with conduits 22 and 43 by a branch conduit 54 having a control valve 56 therein whereby air under high pressure is supplied to the nozzles 23 and 42. The upper portion of the larger tank 49 is connected to conduit 53 by a conduit 57 having a pressure regulator 58 associated therewith to reduce the pressure of the air introduced into tank 49 to a pressure of approximately 5 pounds per square inch.

The air supply conduit 53 communicates with the top of the smaller tank 48 by a conduit 59 having a four-way valve 61 associated therewith, as shown in FIG. 5. With the four-way valve 61 in the solid line position shown in FIG. 5, the high pressure air flows directly to the top of the smaller tank 48 to thus introduce air at approximately 90 pounds per square inch at the top of tank 48. Upon rotation of the valve 61 to the dotted line position shown in FIG. 5, the supply of high pressure air through conduit 59 to tank 48 is interrupted and the air in tank 48 is exhausted to the atmosphere through a conduit 62. A plug 63 closes one port of the four-way valve 61 whereby the supply of high pressure air to the four-way valve is interrupted upon movement of the valve 61 to the dotted line position shown in FIG. 5. Upon movement of the four-way valve 61 to the dotted line position, the pressure in tank 48 is reduced whereby water than flows from the larger tank 49 into the smaller tank 48 each time the four-way valve 61 is moved to the dotted line position. That is, the air under pressure introduced into the top of tank 49 by conduit 57 plus the weight of the water in tank 49 assures flow of water from tank 49 to the smaller tank 48 immediately upon exhausting the air from tank 48 by exhaust conduit 62. By providing the smaller size tank 48 which is pressurized, a smaller area is under compression whereby a constant pressure can be easily maintained. Also, by providing the smaller tank 48 under pressure, there is less differential in pressure brought about by a lowering of the liquid level in tank 48, as would be the case, where a large tank is employed as the high pressure unit for supplying water directly to the nozzle 23 and 42.

The conduit 46 communicates with the upper end of the hollow drill rod 12 by a conduit 64 having a control valve 66 therein. The upper end of the drill rod 12 is provided with the usual swivel unit 67 which is connected to an air supply conduit 68 for supplying air downwardly through the drill rod to clear the hole being bored of cuttings, dust and the like. By providing the conduit 64 and the control valve 66, water under high pressure may be introduced selectively into the hollow drill rod 12, if desired. On the other hand, by closing the valve 66, the water under high pressure is introduced only into the nozzle assemblies having nozzles 23 and 42, as shown in FIG. 5.

From the foregoing description, the operation of our improved apparatus for settling dust particles will be readily understood. The valve 47 is opened and the four-way valve 61 is moved to the solid line position shown in FIG. 5 to thus introduce air under a pressure of approximately 90 pounds per square inch into the upper end of the smaller tank 48. The pressure regulator 58 maintains the pressure in the larger tank 49 at approximately 5 pounds per square inch. With the valves thus set, both water and air under extremely high pressures are introduced to the individual nozzles 23 and 42 of the nozzle assemblies. An atomized mixture of water and air is introduced downwardly toward the hole 13 in a direction opposite the direction of movement of the cuttings and dust from the hole. By introducing the atomizing mixture at an extremely high pressure which is brought about by the introduction of the water under extremely high pressures into the nozzle, water is supplied fast enough to overcome the bailing velocity of the air, cuttings and dust from the opening 13 being bored. After passing from the housing 17 and beyond the nozzle assembly 19 having the individual nozzles 23, the cuttings, dust and air flow through passageways 18 and then upwardly through conduit 34. As the cuttings, dust and air pass through conduit 36 to the pre-skimmer 37, the nozzle 42 introduces an atomized mixture of water and air under high pressure in the same direction as the moving particles of dust, cuttings and air to thus assure complete removal of the dust particles prior to discharging the clean air at the upper end of conduit 41. While we have shown only one nozzle 42, it will be apparent that the nozzle assembly directing the atomized mixture of water and air into the conduit 36 could comprise a plurality of nozzles 42.

If it is desired to introduce water under high pressure downwardly through drill rod 12, the valve 66 may be opened whereupon water is introduced directly into the upper end of the drill rod 12.

From the foregoing, it will be seen that we have devised an improved apparatus for settling dust from a moving stream of air carrying cuttings, dust and the like from a hole being bored. By introducing water under extremely high pressures into the nozzles 23 and 42, we not only introduce a considerably greater volume of water into the system but also bring about a sudden explosion of the water as it passes from the liquid state to the vapor state at the point of discharge from the nozzles 23 and 42. Also, by first introducing the atomized mixture of high pressure water and air in a direction countercurrent to the direction of movement of the cuttings, dust and air from the hole being bored and then introducing the atomized mixture of high pressure water and air into the moving stream of cuttings, dust and air whereby the mixture of water and air travel along with the dust, the vapor remains in contact with the dust particles for a longer period of time, thus further assuring complete removal of the dust from the air prior to discharging the air through conduit 41.

While we have shown our invention in but one form, it will be obvious to those skilled in the art that it is not so limited, but is susceptible of various other changes and modifications without departing from the spirit thereof.

What we claim is:

1. In apparatus for settling dust particles produced by drilling a hole into a mass of rock-like material with a hollow rod adapted to convey air from an air pressure source to clear the hole being bored of cuttings and dust particles with the air, cuttings and dust particles being discharged from the hole around the outer surface of said rod,
   a. a first nozzle assembly having angularly spaced nozzles supported in spaced relation around the outer surface of said rod and outwardly of said hole with the discharge ends of said nozzles directed generally toward said hole,
   b. a second nozzle assembly having at least one nozzle with the discharge end thereof directed in the direction of movement of said air, cuttings and dust particles after passing said first nozzle assembly,
   c. means supplying air under high pressure to said first and second nozzle assemblies,
   d. a first water supply tank,
   e. a second water supply tank having a substantially greater volume than said first water supply tank,
   f. means communicating the lower portion of said second water supply tank with said first water supply tank to supply water to said first water supply tank,
   g. means supplying air under low pressure to said second water supply tank,
   h. means upplying air under high pressure to said first water supply tank maintaining water under high pressure in said first water supply tank, and
   i. means communicating said first water supply tank with said first and second nozzle assemblies so that an atomized mixture of water and air under high pressure is discharged from each nozzle.

2. Apparatus for settling dust particles as defined in claim 1 in which the water under high pressure is mixed with air under high pressure adjacent the point of discharge from each nozzle.

3. Apparatus for settling dust particles as defined in claim 1 in which air is supplied to said first water supply tank at a pressure of approximately 90 pounds per square inch.

4. Apparatus for settling dust particles as defined in claim 1 in which air is supplied to said second water supply tank at a pressure of approximately 5 pounds per square inch.

5. Apparatus for settling dust particles as defined in claim 1 in which said means supplying air under high pressure to said first water supply tank comprises:
   a. a conduit communicating with said first water supply tank,
   b. a valve unit operatively connected to said conduit and movable selectively to a first position to supply water under high pressure to said first water supply tank and to a second position to exhaust said conduit to the atmosphere so that the pressure in said first water supply tank is selectively increased and decreased and water flows from said second water supply tank to said first water supply tank upon said decrease in pressure within said first water supply tank.

6. Apparatus for settling dust particles as defined in claim 1 in which said first water supply tank also communicates with said hollow rod by a supply conduit having a control valve therein whereby water under high pressure is selectively introduced into said hollow rod.

7. Apparatus for settling dust particles as defined in claim 1 in which a depending housing surrounds said first nozzle assembly with a discharge passageway in said housing communicating with a discharge conduit for said air, cuttings and dust.

8. Apparatus for settling dust particles as defined in claim 7 in which said discharge conduit communicates with a separator unit for separating solids from gases.

9. Apparatus for settling dust particles as defined in claim 8 in which said second nozzle assembly is mounted in position to discharge an atomized mixture of air and water under high pressure into the moving stream of air, cuttings and dust just prior to movement thereto into said separator unit.

10. Apparatus for settling dust particles as defined in claim 8 in which said separator unit comprises:
   a. a pre-skimmer disposed to receive said air, cuttings and dust and remove the heavier particles from the air and lighter particles, and
   b. a rotary separator receiving said air and lighter particles from said pre-skimmer whereby the air is separated from said lighter particles.

* * * * *